United States Patent Office 2,831,726
Patented Apr. 22, 1958

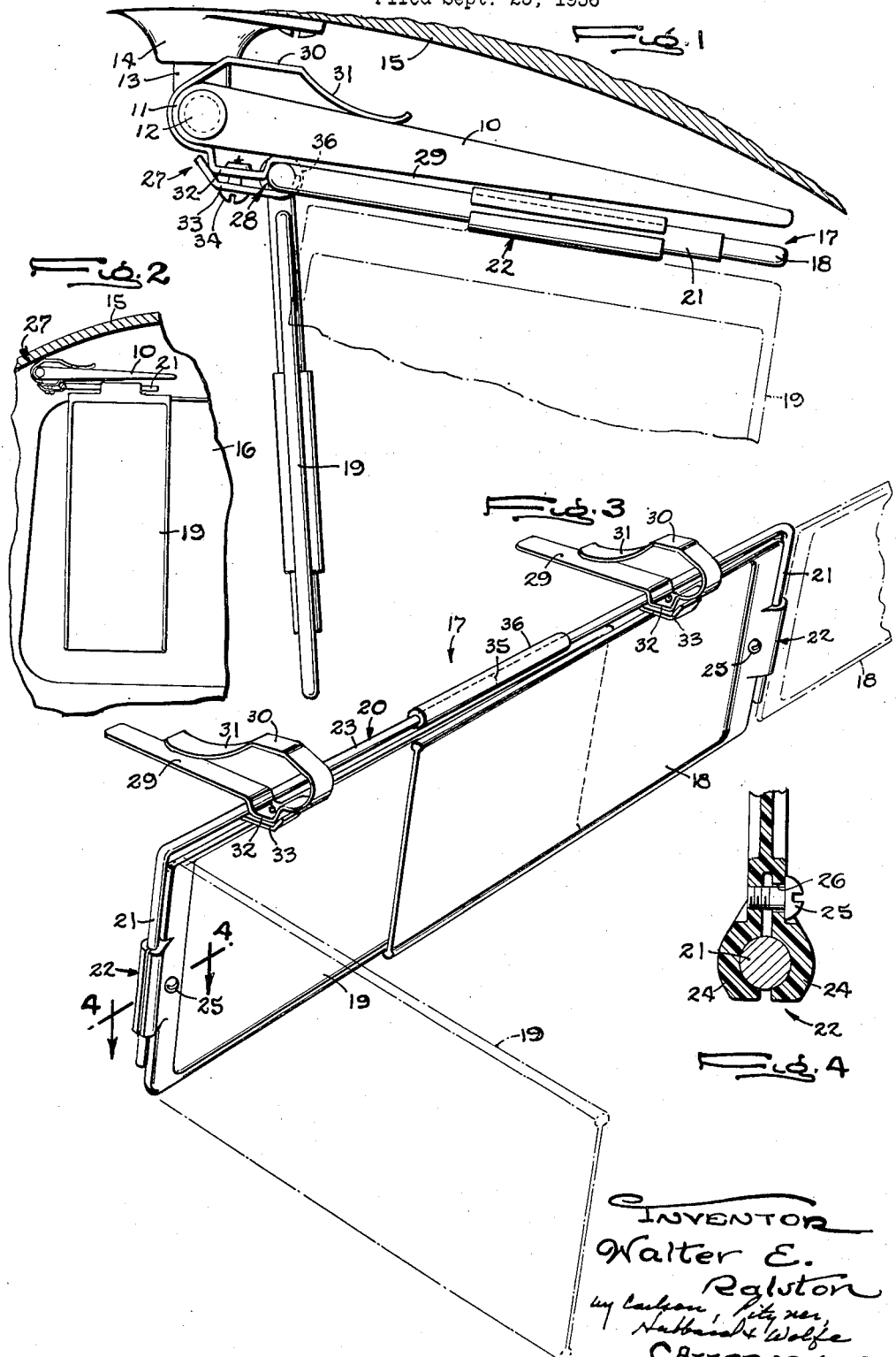

2,831,726

SUN VISOR ATTACHMENT

Walter E. Ralston, Rockford, Ill.

Application September 25, 1956, Serial No. 611,965

4 Claims. (Cl. 296—97)

This invention relates generally to sun visors or glare shields for automotive vehicles and, more particularly, to an attachment for augmenting the protection obtainable from a visor of the type now furnished as standard equipment on vehicles and comprising an opaque panel of generally flat rectangular shape mounted on the vehicle body to swing about a vertical axis at one end of the panel and about a horizontal axis extending along one edge of the panel.

A general object of the invention is to provide a novel auxiliary sun visor attachment which may be constructed easily of a few low cost parts, which may be mounted readily on standard visors of different sizes and shapes without damage thereto, and which provides a wide variety of shielding conditions not obtainable with prior attachments of this character.

Another object is to extend the shielded area beyond opposite ends of the standard visor by the provision of two auxiliary visors mounted for individual adjustment about different axes relative to the standard visor.

A more detailed object is to mount each auxiliary visor on a novel U-shaped supporting rod for adjustment relative thereto about one axis and to mount the rod on a standard visor for adjustment of the auxiliary visor about a second axis transverse to the first.

The invention also resides in the simple and inexpensive construction of the mounting means by which the supporting rod is attached to the standard visor.

Other objects and advantages of the invention will become apparent from the following detailed description taken in connection with the accompanying drawings, in which Figure 1 is an end elevational view of a standard visor and an attachment therefor embodying the novel features of the present invention, the standard visor being disposed in a horizontal position in front of the vehicle operator.

Fig. 2 is a view similar to Fig. 1 with the attachment parts in different positions and the standard visor disposed horizontally and to the left of the operator.

Fig. 3 is a perspective view of the attachment.

Fig. 4 is a fragmentary sectional view taken along the line 4—4 of Fig. 3.

For purposes of illustration, the invention is shown in the drawings in conjunction with a standard sun visor or glare shield 10 in the form of an opaque panel of generally flat rectangular shape. Extending through a horizontal edge portion 11 of the panel is a pivot pin 12 which is supported cantilever fashion on and is journaled in a vertical pivot pin 13 for rotation of the panel about such edge portion. A bracket 14 secured to the vehicle body 15 adjacent the upper left corner of the windshield 16 supports the vertical pin 13 for bodily swinging of the horizontal pin and the panel in a horizontal plane. With this construction, the standard visor may be adjusted to selected positions about the two pins to shield the vehicle operator from glare directly to his front or to his left.

In accordance with the present invention, the shielded area and the protection available to the vehicle operator with the standard visor 10, particularly against lights of approaching vehicles at night, are increased by the provision of a novel visor attachment 17 which is readily adaptable to standard visors of different sizes and shapes, which comprises few parts of simple and inexpensive construction, and which may be adjusted easily to a wide variety of positions relative to the standard visor. To enable the shielded area to be extended beyond opposite ends of the standard visor at the same time or beyond only one end at a time, two auxiliary visors 18 and 19 of generally flat rectangular shape are mounted on the standard visor for swinging individually about two axes in parallel planes and between inactive positions against the standard visor and active positions beyond the ends thereof. Other positions of the auxiliary visors relative to the standard visor are obtained by further mounting the auxiliary visors for swinging about another axis extending transversely of their individual axes and along the pivoted edge portion 11 of the standard visor.

Mounting of the auxiliary visors 18 and 19 for swinging individually about parallel axes and also about the transverse axis is effected in a simple manner by the provision of a U-shaped supporting rod 20. The two laterally spaced parallel legs 21 of the latter are slightly shorter than the width of the main visor 10 and receive bearings 22 on the auxiliary visors for individual angular swinging of these visors about the legs. The closed end or intermediate portion 23 of the U joins the legs and is rotatably mounted on the standard visor for bodily swinging of the legs and the auxiliary visors about the axis of such portion.

The construction of each of the auxiliary visors 18 and 19 and its bearing 22 preferably are simplified by forming the same integral with each other in a single molding operation from a suitable transparent plastic material which is colored to reduce glare. Each bearing is formed as a split cylinder extending along one end edge of its visor and having opposed laterally spaced halves 24 which are connected together at the visor edge and are drawn against opposite sides of the corresponding one of the rod legs 21 by a screw 25 extending through an aperture 26 (Fig. 4) in one half and threaded into the other half. The screw is turned to draw the halves against the rod until the bearing pressure is sufficient to hold the visor against swinging under its own weight about the leg while permitting easy manual adjustment of the position of the visor on the leg.

To obtain a large shielding area at least one of the auxiliary visors 18 and 19 is longer than one half of the spacing between the rod legs. In this instance, the two visors are of the same length equal approximately to two-thirds of the leg spacing. The width of each visor is the same as that of the other and is greater than the lengths of the legs but less than the width of the standard visor 10.

The supporting rod 20 is mounted on the standard visor 10 by novel means 27 which is of simple and inexpensive construction and is readily adaptable to standard visors of different sizes and shapes without defacing the same. This means comprises clips of generally U-shaped and resilient material such as spring steel adapted to receive and frictionally grip the pivoted edge portion 11 of the standard visor at spaced points. Friction bearings 28 on the respective clips receive and support spaced parts of the closed rod end portion 23 while frictionally gripping the same to hold the rod and the auxiliary visors against turning under their own weight. One leg 29 of each clip in this instance is generally straight and the other leg includes a straight portion 30 laterally spaced from the straight leg and an end portion 31 curving inwardly toward the straight leg but spaced therefrom a distance less than the thickness of the main visor. Thus, when the latter is inserted between the legs of each clip, the legs tend to resume their normal positions and frictionally grip the sides of the main visor.

To reduce cost of the clips 27 and the bearings 28, a part of each bearing is defined by the straight leg 29 of each clip. For this purpose, a portion of this leg on each clip is offset outwardly adjacent the closed end 23 of the U to form a lug 32 (Fig. 1). Cooperating with the latter to complete the bearing is a plate 33 of U-shaped cross section having one end portion bearing against the rod end portion 23 and a straight end portion bearing against the lug. The plate is drawn toward the lug and against the rod by turning a screw 34 extending through an aperture in the plate and threaded into the lug. Being laterally spaced from the plane of the straight leg 29 of each clip, the inner side of the lug 32 thereon defines a recess receiving the inner end of the screw so as to avoid contact of the screw with the main visor.

The supporting rod 20 in this instance is bent from wire of circular cross section with the legs 21 normal to the closed end portion 23 and with the latter straight and of approximately the same length as the standard visor 10. While the rod may be formed of a single piece of wire so that the legs and the auxiliary visors 18 and 19 thereon swing in unison about the axis of the closed end portion, the rod preferably is divided as indicated at 35 intermediate its ends and the bearings 28 thereby forming two L-shaped pieces each having one straight part constituting one of the legs 21 and another straight part alined with the corresponding part of the other piece to form the closed end 23 of the rod. To guide the pieces for movement relative to each other about the axis of the closed end portion of the rod, the alined parts are coupled together by a sleeve 36 telescoping over adjacent ends of both parts. With this construction, each auxiliary visor is adjustable individually about the axis of the closed end portion 23 as well as about the axis of its supporting leg 21. In the present instance the sleeve is formed of transparent plastic tubing sized to receive and frictionally grip the alined parts of the closed end portion while permitting relative rotation thereof about the axis of the sleeve.

In the assembly of the parts of visor attachment 17 after they have been formed, the legs 21 of the rod 20 are inserted in the bearings 22 on the auxiliary visors 18 and 19 and the screws 25 are adjusted to obtain the desired bearing pressure. Next, with the clip screws 34 loosened and the two parts of the closed rod end portion 23 abutting each other within the sleeve 36, one of the clips 27 is fastened to each of these parts by inserting the part between the lug 32 and the cooperating plate 33 of the clip, both clips being disposed on the same side of the closed end portion of the rod. After insertion of the parts of this rod portion between the lugs and the bearing plates, the screws 34 are tightened to clamp the plates against the rod and the latter against the lugs.

To mount the assembled attachment 17 on the main visor 10, the clips 27 are simply slipped over the pivoted edge portion 11 until the latter engages the closed ends of the clips with the rod 20 approximately centered longitudinally of the main visor. In their inactive positions, the rod legs 21 lie in the same plane and against the adjacent side of the main visor as shown in the case of one auxiliary visor 18 in full lines in Fig. 1. Also, the auxiliary visors 18 and 19 extend toward and lie against each other substantially in the plane of the rod legs as shown in full lines in Fig. 3.

To utilize the auxiliary visors 18 and 19 in place of the main visor 10 directly in front of the vehicle operator, the main visor is swung forwardly away from the operator and into a horizontal position shown in Fig. 1 and the rod legs 21 with the auxiliary visors in their inactive positions are swung downwardly into vertical positions shown in full in Fig. 3 and in full in the case of the left auxiliary visor 19 in Fig. 1. With the rod legs in such vertical positions, the auxiliary visor 19 on the left may be swung through a quarter revolution about its leg 21 as shown in phantom in Fig. 3 thereby shielding the area to the left of the operator. Also, the other auxiliary visor 18 may be swung through a half revolution about its leg 21 and into a position on the right as shown in phantom in Fig. 3. With the auxiliary visors in these positions and the main visor in a vertical position in front of the operator, the shielded area is more than double that available with the main visor alone and is distributed on both sides of the main visor. If it is desired to use only one visor 19 while the other remains in its inactive position, the active visor with its leg 21 is simply swung about the axis of the closed end portion 23 as shown in Fig. 1, the division 35 of this portion and the sleeve 36 permitting such relative swinging of the rod legs.

An especially advantageous shielding condition obtainable with the improved attachment 17 is that shown in Fig. 2. Here, the main visor 10 is in a horizontal position to the left of the operator, the rod legs 21 lie against the main visor and the left auxiliary visor 19 depends from its supporting leg 21 as shown in phantom in Fig. 1 and is disposed vertically at the left end portion of the windshield 16. In this position, the visor shields the operator from the glare of lights of other vehicles approaching at night, particularly when such lights are closest to the operator at the left end of the windshield. At the same time, the longer visor, being transparent, does not block the vision of the operator.

It will be apparent that the two auxiliary visors 18 and 19, due to their swinging individually about the axes of the legs 21 and about the transverse axis of the closed rod end portion 23, permit of a wide variety of shielding conditions including extension of the shielded area beyond both ends of the standard visor 10. Such swinging movements are obtained simply and inexpensively by mounting the auxiliary visors on the legs of the U-shaped rod 20 which in turn are swingable individually relative to the standard visor about the axis of the closed end portion 23. By virtue of the novel construction of the clips 27, the latter not only grip the standard visor without defacing the same, but also, provide bearing surfaces for the rod thereby reducing the number of the parts and the cost of the attachment.

I claim as my invention:

1. An auxiliary sun visor attachment having, in combination, a U-shaped rod divided into two pieces of L-shape each having two perpendicular parts one of which is alined with the corresponding part of the other piece to form the closed end of the U and the other of which constitutes one of the legs of the U, a first auxiliary visor of generally flat rectangular shape mounted on one of said legs for rotation relative thereto about one edge of the visor and against a frictional resistance sufficient to prevent turning of the visor under its own weight when the leg is disposed horizontally, a second visor of generally flat rectangular shape similarly mounted on the other of said legs, and a guide member receiving said first parts of said pieces to maintain the same in axial alinement while permitting rotation of one part relating to the other, said closed end portion of said rod being adapted for detachable mounting on a standard sun visor to rotate about the longitudinal axis of the end portion and against a frictional resistance sufficient to prevent such rotation under the weight of said legs and said auxiliary visors thereon.

2. An auxiliary sun visor attachment having, in combination, a U-shaped rod providing laterally spaced parallel legs and a straight closed end portion connecting the legs at one of their ends, a first auxiliary visor of generally flat rectangular shape mounted on one of said legs for rotation relative thereto about one edge of the visor and against a frictional resistance sufficient to prevent turning of the visor under its own weight when the leg is disposed horizontally, and a second visor of generally flat rectangular shape similarly mounted on the other of said legs, said closed end portion of said rod being adapted for detachable mounting on a standard sun visor to rotate about the longitudinal axis of the end portion and against a frictional resistance sufficient to prevent such rotation under the weight of said legs and said auxiliary visors thereon.

3. The visor attachment defined in claim 2 in which the length of at least one of said auxiliary visors in a direction normal to said end edge thereof is greater than one-half of the spacing between said rod legs.

4. The visor attachment defined in claim 2 in which said rod is divided into two pieces of L-shape each having one part constituting one of said legs and its other part alined with the corresponding part of the other leg to form said closed end portion and which includes a sleeve telescoping over both of said alined parts and guiding the same for rotation relative to each other.

References Cited in the file of this patent

UNITED STATES PATENTS

| | | |
|---|---|---|
| 1,775,486 | Clements | Sept. 9, 1930 |
| 2,020,585 | Stansberry | Nov. 12, 1935 |
| 2,204,691 | Olsen | June 18, 1940 |
| 2,261,881 | Horstmann | Nov. 4, 1941 |
| 2,323,072 | Murata | June 29, 1943 |
| 2,528,038 | Crise | Oct. 31, 1950 |
| 2,542,409 | Guenther | Feb. 20, 1951 |